United States Patent [19]

Blackwell

[11] 3,935,347
[45] Jan. 27, 1976

[54] DISPERSION OF ARYLENE SULFIDE POLYMER CONTAINING FLUOROCARBON POLYMER FOR FORMING COATINGS

[75] Inventor: Jennings P. Blackwell, Bartlesville, Okla.

[73] Assignee: Phillips Petroleum Company, Bartlesville, Okla.

[22] Filed: Sept. 13, 1974

[21] Appl. No.: 505,917

Related U.S. Application Data

[62] Division of Ser. No. 299,065, Oct. 19, 1972, Pat. No. 3,856,735.

[52] U.S. Cl. ............... 427/388; 427/385; 427/407; 427/409; 427/419; 427/421
[51] Int. Cl.$^2$ ..................... B05D 7/14; B05D 1/02
[58] Field of Search ...... 117/132 B, 132 CF, 132 A, 117/161 R, 161 UF; 260/26.9 F, 26.9 MQ, 26.9 MN

[56] References Cited
UNITED STATES PATENTS

| | | | |
|---|---|---|---|
| 3,311,494 | 3/1967 | Reinert et al. | 117/75 |
| 3,312,651 | 4/1967 | Daniels et al. | 260/29.6 |
| 3,492,125 | 1/1970 | Ray | 99/1 |
| 3,616,186 | 10/1971 | Blackwell | 161/187 |
| 3,622,376 | 11/1971 | Tieszen et al. | 117/132 B |
| 3,652,327 | 3/1972 | Hill et al. | 117/132 B |
| 3,701,665 | 10/1972 | Grimes et al. | 99/1 |
| 3,819,407 | 6/1974 | Oates et al. | 117/138.8 N |

*Primary Examiner*—P. E. Willis, Jr.

[57] ABSTRACT

High molecular weight fluorocarbon polymer is incorporated into arylene sulfide polymer coating dispersions by (a) intensive milling of the fluorocarbon polymer and a liquid capable of wetting same and (b) thereafter adding the arylene sulfide polymer and a pigment or filler and subjecting the mixture to additional intensive milling.

16 Claims, No Drawings

DISPERSION OF ARYLENE SULFIDE POLYMER CONTAINING FLUOROCARBON POLYMER FOR FORMING COATINGS

This is a divisional of copending application Ser. No. 299,065 filed Oct. 19, 1972 now U.S. Pat. No. 3,856,735.

BACKGROUND OF THE INVENTION

This invention relates to the preparation of arylene sulfide polymer coating compositions containing high molecular weight fluorocarbon polymer.

Arylene sulfide polymers are known for their desirable characteristics as coating compositions as shown for instance by Ray U.S. Pat. No. 3,492,125. It has been found that in some instances it is preferred to incorporate a small amount of fluorocarbon polymer with the arylene sulfide polymer coating composition. While relatively low molecular weight fluorocarbon polymer such as that sold by LNP Corp. under the trademark TL-126 can be incorporated into such dispersions relatively easily, it has been found that the high molecular weight fluorocarbon polymers are difficult to disperse evenly in an arylene sulfide polymer coating composition.

BRIEF SUMMARY OF THE INVENTION

It is an object of this invention to provide an arylene sulfide polymer coating composition containing a high molecular weight fluorocarbon polymer.

It is a further object of this invention to provide a method for incorporating high molecular weight fluorocarbon polymers into arylene sulfide polymer coating compositions.

It is yet a further object of this invention to provide a convenient method of determining the optimum cure for an arylene sulfide polymer coating composition.

And still yet a further object of this invention is to provide an arylene sulfide polymer coating having smooth surface characteristics.

In accordance with this invention, the high molecular weight fluorocarbon polymer is first subjected to intensive milling in a liquid capable of wetting same and thereafter mixed with arylene sulfide polymer and a pigment or filler, with the resulting mixture being subjected to additional intensive milling.

DESCRIPTION OF THE PREFERRED EMBODIMENTS

The instant invention is applicable to the incorporation of any high molecular weight fluorocarbon polymer into arylene sulfide polymer coating compositions. The preferred fluorocarbon polymer is polytetrafluoroethylene. The invention makes possible the successful incorporation of fluorocarbon polymers having a high molecular weight. By high molecular weight is meant polymers of such molecular weight that no flow is obtained in the ASTM D 1238 melt viscosity test at 380°C using a 5,000 g weight. Probably such polymers have a number average molecular weight of greater than 10 million. These are the types of polymers generally referred to as extrusion or molding grade polymers. Such polymers are sold under trademarks Teflon-5, Teflon-6, Teflon-7, and Halon G-80. The preferred polymers pass the FDA specification for acceptable PTFE (polytetrafluoroethylene) in food service which requires a melt viscosity of at least 10,000 poise at 380°C as determined by ASTM D 1238 and a thermal instability index (TII) of less than 50 as determined by ASTM D 1457.

The invention is applicable to the production of dispersions of any arylene sulfide polymer although the preferred polymer is polyphenylene sulfide having a melting or softening point of at least 300°F, preferably 400°F to 850°F.

The intensive milling used in the initial dispersion of the fluorocarbon in the liquid and the subsequent milling of this mixture with a pigment and arylene sulfide polymer can be accomplished by the use of a conventional ball mill, a conventional rod mill, or a vibratory ball mill. The balls or rods can be made of steel, ceramic materials such as Burundum (a high-fired ceramic), and the like. Both of the operations can be carried out in the same mill or separate mills, including the use of different types of mills for each of the two steps.

It is essential that there be some pigment or filler present during the second milling step. The ratio of fluorocarbon to pigment can vary from 0.1 to 3 parts by weight of fluorocarbon polymer per 1 part by weight of pigment or filler. Preferably about 0.5 to 2 parts of fluorocarbon polymer per 1 part by weight of pigment or filler is utilized.

The pigment or filler can be any pigment or filler capable of withstanding a curing temperature of at least about 300°F, preferably 600°–850°F. It is preferred to use pigments and the most preferred pigments are titanium dioxide or black iron oxide. Particularly suitable are combinations of titanium dioxide and iron oxides. Other suitable pigments include red iron oxide, brown iron oxide, carbon black, and zinc oxide. Suitable fillers include such materials as silica and talc.

The liquid in which the fluorocarbon polymer is milled can be any liquid capable of wetting the fluorocarbon. The preferred liquid is water containing a surface active agent. Other suitable liquids include ethylene glycol, propylene glycol, and mixtures of such liquids with water. Any conventional surface active agent can be utilized; however, nonionic surface active agents are preferred.

While the ratio of solids (comprising the arylene sulfide polymer, pigment, and fluorocarbon polymer) to liquid can vary depending on the particular coating application, it is generally preferred to have a dispersion of about 15 to 40 weight per cent solids.

The initial intensive milling of the liquid and fluorocarbon polymer can be carried out for a time of greater than about 4, preferably within the range of 8 to 96 hours with the milling time for the subsequent intensive milling of the pigment or filler and arylene sulfide polymer with the liquid and fluorocarbon polymer being carried out for a time of greater than about 2, preferably within the range of 4 to 48 hours, this time generally being about one half the time required in the initial milling. With a high speed vibrator such as the Vibratom with stainless steel balls the first stage intensive milling can be accomplished in 0.5 to 10 hours and the second stage of intensive milling can be carried out in 0.5 hour to 5 hours.

The ratio of arylene sulfide polymer to fluorocarbon polymer in the final cured coating composition will generally range from 2:1 to 40:1, preferably 4:1 to 15:1.

It is essential that the pigment, fluorocarbon polymer, and arylene sulfide polymer be in particulate form. In general, the smaller the particle size the better the dispersion which can be produced. A suitable particle size for the fluorocarbon polymer is 40 mesh or smaller. The pigment or filler can be the same particle size (40 mesh or smaller), the arylene sulfide polymer will generally be about 40 mesh or smaller also although satisfactory results can be obtained with coarser material, for instance 30 mesh or smaller. The intensive milling will generally reduce the arylene sulfide polymer particle size with the final particle size generally being below 100 mesh (Standard U.S. Sieve Series), although for the most part the effect of the milling is to break up agglomerates rather than to reduce the particle size of the components drastically.

The final dispersion can be applied to a substrate by any conventional means such as spraying, or with a doctor blade or the like.

The resulting coating can be cured, for instance by heating to a temperature of at least 500°F, preferably 600°–850°F for at least 5 minutes, preferably 15 minutes to 2 hours. The coatings can be cured at the higher temperatures with the shorter times. It is particularly desirable in many instances to utilize as the pigment a material which will change in color after a temperature treatment which corresponds to the point at which the polymer is properly cured. For instance black ferric oxide remains jet black after 15 minutes at 600°F but is dull black after 30 minutes at 600°F and is dull brown (or, depending on other ingredients, a brownish hue or a red or maroon clearly distinguishable from the original black) after 60 minutes at 600°F. This color change can be visually observed and the coated article removed at just the right stage of cure. Also this allows a color difference when a second coat of the same composition is applied so as to give a ready means of determining if the second coat completely covers the surface.

EXAMPLE I

A nine gram sample of Teflon-5 powder was ball milled for 24 hours with 300 ml of water containing six grams of a nonionic wetting agent sold under the trademark Triton X-100. The Teflon-5 polytetrafluoroethylene powder had an average particle size of 325 microns before milling. To this aqueous slurry was then added 60 grams of polyphenylene sulfide having an inherent viscosity of about 0.15 as determined by using 0.25 per cent of the sample in chloronaphthalene at 206°C. This polyphenylene sulfide had a particle size of less than 60 mesh. Also added to the aqueous slurry was 9 grams of black iron oxide. The resulting mixture was ball milled for 16 hours. This slurry was sprayed through a 100 mesh screen onto a 3 × 6 × 0.020 inch aluminum alloy coupon which had been degreased by washing in acetone and blasted with No. 100 abrasive. The resulting coating was cured for 30 minutes at 700°F to give a very smooth coating. The coating color changed from black in the uncured coating to a brownish hue in the cured coating. The microknife hardness was 250, and the coating had an adhesion rating of less than 4 (scale 1–15, 1 best, 4 considered very good).

EXAMPLE II

Slurries were made by ball milling Teflon-5 with water containing 2 weight per cent nonionic wetting agent, octylphenoxypolyethoxy ethanol (Triton X-100, Rohm & Haas Co.) for 24 hours before adding the other ingredients in ball milling for times as set out hereinbelow.

| Reference | Composition (Parts/100 PPS) | Time for Ball-Milling: Teflon | PPS + Pigment | Total |
|---|---|---|---|---|
| Example I | 15 Fe$_3$O$_4$/15 T-5* | 24 | 16 | 40 hr |
| Run 2 | 15 Fe$_3$O$_4$/7.5 T-5 | 24 | 16 | 40 |
| Run 3 | 33 Fe$_3$O$_4$/15 T-5 | 24 | 66 | 90 |
| Run 5 | 33 TiO$_2$/13 T-5 | 24 | 66 | 90 |
| Run 5 | 33 TiO$_2$/13 T-5 | 24 | 24 | 48 |

*T-5 = Teflon-5, molding grade PTFE having a particle size of about 325 microns and believed to be of a molecular weight greater than 10,000,000. This polymer exhibited a 0 flow in the ASTM D 1238 melt viscosity test at 380°F using a 5,000 g. weight.

All slurries were sprayed through 100 mesh screen with a Binks Model 18B spray gun onto aluminum coupons as in Example I and cured at 700°F for 30 minutes. In all instances a smooth coating was obtained so that the excess milling time used in Runs 3 and 4 was not really required for this result.

CONTROL

Similar dispersions to those of the Examples were made except the polyphenylene sulfide, polytetrafluoroethylene, pigment, and aqueous surface active agent solutions were all ball milled together for various times up to 7 days. The resulting coatings in each case were rough. An identical procedure (all ingredients mixed together) utilizing low molecular weight fluorocarbon polymers such as TL-126 which has a melt viscosity at 380°C of 4 × 10$^3$ gave a smooth coating.

While this invention has been described in detail for the purpose of illustration it is not to be construed as limited thereby but is intended to cover all changes and modifications within the spirit and scope thereof.

What is claimed is:

1. A process for forming a coated article comprising: applying to a substrate a dispersion formed by subjecting fluorocarbon polymer, in particulate form having a molecular weight sufficient to give a melt viscosity flow of 0 at 380°C using a 5,000 g. weight, to intensive milling by ball milling or rod milling with a liquid selected from water, ethylene glycol, or propylene glycol; and thereafter adding thereto poly(arylene sulfide) in particulate form and a pigment or filler in particulate form and subjecting the resulting mixture to additional intensive milling by ball milling or rod milling; and
heating said thus applied dispersion at a temperature of at least 500°F to form a cured coating.

2. A method according to claim 1 wherein said fluorocarbon polymer is polytetrafluoroethylene.

3. A method according to claim 1 wherein a ratio of said fluorocarbon polymer to said pigment or filler is within the range of 0.1 to 3 parts by weight of fluorocarbon polymer per 1 part by weight of said pigment or filler, the ratio of said poly(arylene sulfide) to said fluorocarbon polymer is within the range of 2:1 to 40:1, and wherein the total solids content is within the range of 15 to 40 weight per cent based on the total weight of said dispersion.

4. A method according to claim 3 wherein said liquid is water containing a surface active agent.

5. A method according to claim 1 wherein said poly(arylene sulfide) is polyphenylene sulfide said substrate is an aluminum alloy, said fluorocarbon polymer is polytetrafluoroethylene, and said filler or pigment is black iron oxide.

6. A method according to claim 4 wherein said pigment is selected from the group consisting of titanium, dioxide, iron oxide, and mixtures thereof.

7. A method according to claim 4 wherein said pigment, fluorocarbon polymer, and arylene sulfide polymer each have a particle size of less than 40 mesh, said substrate is an aluminum alloy and wherein said surface active agent is a nonionic wetting agent.

8. A method according to claim 5 wherein said intensive milling of said liquid and fluorocarbon polymer is done for a time period of greater than 4 hours and said intensive milling of the resulting mixture with said polyphenylene sulfide and said pigment or filler is done for a time of greater than 2 hours.

9. A method according to claim 1 wherein said thus applied dispersion is heated at a temperature within the range of 600° to 850°F for a time within the range of 15 minutes to 2 hours in order to effect said cure.

10. A method according to claim 1 wherein said dispersion is applied by means of spraying, said intensive milling being carried out by means of a high speed vibrator with stainless steel balls, said intensive milling of said liquid and fluorocarbon polymer being done for a time period of 0.5 to 10 hours and said intensive milling of the resulting mixture with said poly(phenylene sulfide) and said pigment or filler being done for a time period of 0.5 to 5 hours.

11. A method according to claim 10 wherein said composition contains the pigment black iron oxide.

12. A method according to claim 10 wherein said curing is continued until a color change occurs in the coating.

13. A coated article prepared by the method of claim 1.

14. A method of forming a cured arylene sulfide polymer coating comprising forming a dispersion of said arylene sulfide polymer in a liquid selected from water, ethylene glycol, or propylene glycol with a pigment which changes color on heating, applying said dispersion to a substrate, and heating said thus applied dispersion at a temperature of at least 500°F for a time period sufficient to cause said pigment to change color.

15. A method according to claim 14 wherein said pigment is black iron oxide and said coating is heated until the initial black color changes to a brownish hue.

16. A method according to claim 14 wherein a second coat of the identical composition is applied over the cured first coat.

* * * * *